United States Patent

Seidu

[11] Patent Number: 6,164,741
[45] Date of Patent: Dec. 26, 2000

[54] OIL BASED COMPUTER PRINTING SYSTEM

[76] Inventor: Sadik Seidu, 5514 8th Avenue, Southeast Calgary, Alberta, Canada, T2A 3P6

[21] Appl. No.: 09/151,820

[22] Filed: Sep. 11, 1998

Related U.S. Application Data

[63] Continuation-in-part of application No. 08/689,594, Aug. 12, 1996, abandoned.

[51] Int. Cl.[7] .......................... H04N 1/034; G01D 11/00; B41J 2/01
[52] U.S. Cl. .............................. 347/3; 347/100; 347/101; 347/105
[58] Field of Search ................................... 347/3, 6, 100, 347/101, 105

[56] References Cited

U.S. PATENT DOCUMENTS

| 4,246,154 | 1/1981 | Yao | 347/100 |
|---|---|---|---|
| 5,340,387 | 8/1994 | Smith | 106/31.6 |
| 5,539,440 | 7/1996 | Higuchi et al. | 347/112 |
| 5,555,007 | 9/1996 | Ceschin et al. | 347/87 |
| 5,631,681 | 5/1997 | Klaus et al. | 347/85 |

FOREIGN PATENT DOCUMENTS 558236   9/1993   European Pat. Off. ................. 347/84

*Primary Examiner*—Thinh Nguyen

[57] ABSTRACT

An oil based computer printing system for providing an efficient effective means for producing artistic printings includes a computer system having a scanner for capturing an image and a printer for printing the image onto a canvas-like material using oil based inks to produce a printing in the style of an oil based painting.

3 Claims, 3 Drawing Sheets

OIL BASED COMPUTER PRINTING SYSTEM

CROSS REFERENCE TO RELATED APPLICATION

This application is a continuation-in-part of my prior utility patent application Ser. No. 08/689,594, filed Aug. 12, 1996 now abandoned.

BACKGROUND OF THE INVENTION

1. Field of the Invention

The present invention relates to computer printing systems and more particularly pertains to a new oil based computer printing system for providing an efficient effective means for producing artistic printings.

2. Description of the Prior Art

The use of computer printing systems is known in the prior art. More specifically, computer printing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art apparatus for creating artistic printings include U.S. Pat. No. 5,294,946; U.S. Pat. No. 5,081,596; U.S. Pat. No. 4,989,163; U.S. Pat. No. 5,023,652; U.S. Pat. No. 5,412,449; U.S. Pat. No. 4,942,542; U.S. Pat. No. 5,121,131; U.S. Pat. No. 4,754,127; U.S. Patent Des. 343, 192; U.S. Pat. No. 5,340,387; U.S. Pat. No. 5,539,440; U.S. Pat. No. 5,631,681; U.S. Pat. No. 5,555,007; and U.S. Pat. No. 4,246,154.

While these devices fulfill their respective, particular objectives and requirements, the aforementioned patents do not disclose a new oil based computer printing system. The inventive device includes a computer system including a scanner for capturing an image and a printer for printing the image onto a canvas-like material using oil based inks to produce a printing in the nature of an oil based painting.

In these respects, the oil based computer printing system according to the present invention substantially departs from the conventional concepts and designs of the prior art, and in so doing provides an apparatus primarily developed for the purpose of providing an efficient effective means for producing artistic printings.

SUMMARY OF THE INVENTION

In view of the foregoing disadvantages inherent in the known types of computer printing systems now present in the prior art, the present invention provides a new oil based computer printing system construction wherein the same can be utilized for providing an efficient effective means for producing artistic printings.

The general purpose of the present invention, which will be described subsequently in greater detail, is to provide a new oil based computer printing system apparatus and method which has many of the advantages of the computer printing systems mentioned heretofore and many novel features that result in a new oil based computer printing system which is not anticipated, rendered obvious, suggested, or even implied by any of the prior art computer printing systems, either alone or in any combination thereof.

To attain this, the present invention generally comprises a computer system including a scanner for capturing an image and a printer for printing the image onto a canvas-like material using oil based inks to produce a printing in the nature of an oil based painting.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil based computer printing system apparatus and method which has many of the advantages of the computer printing systems mentioned heretofore and many novel features that result in a new oil based computer printing system which is not anticipated, rendered obvious, suggested, or even implied by any of the prior art computer printing systems, either alone or in any combination thereof.

It is another object of the present invention to provide a new oil based computer printing system which may be easily and efficiently manufactured and marketed.

It is a further object of the present invention to provide a new oil based computer printing system which is of a durable and reliable construction.

An even further object of the present invention is to provide a new oil based computer printing system which is susceptible of a low cost of manufacture with regard to both materials and labor, and which accordingly is then susceptible of low prices of sale to the consuming public, thereby making such oil based computer printing system economically available to the buying public.

Still yet another object of the present invention is to provide a new oil based computer printing system which provides in the apparatuses and methods of the prior art some of the advantages thereof, while simultaneously overcoming some of the disadvantages normally associated therewith.

Still another object of the present invention is to provide a new oil based computer printing system for providing an efficient effective means for producing artistic printings.

Yet another object of the present invention is to provide a new oil based computer printing system which includes a computer system including a scanner for capturing an image and a printer for printing the image onto a canvas-like material using oil based inks to produce a printing in the nature of an oil based painting.

Still yet another object of the present invention is to provide a new oil based computer printing system that can quickly and efficiently produce printings in the style of an oil based painting.

Even still another object of the present invention is to provide a new oil based computer printing system that can mass produce high quality oil based prints on a canvas-like material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
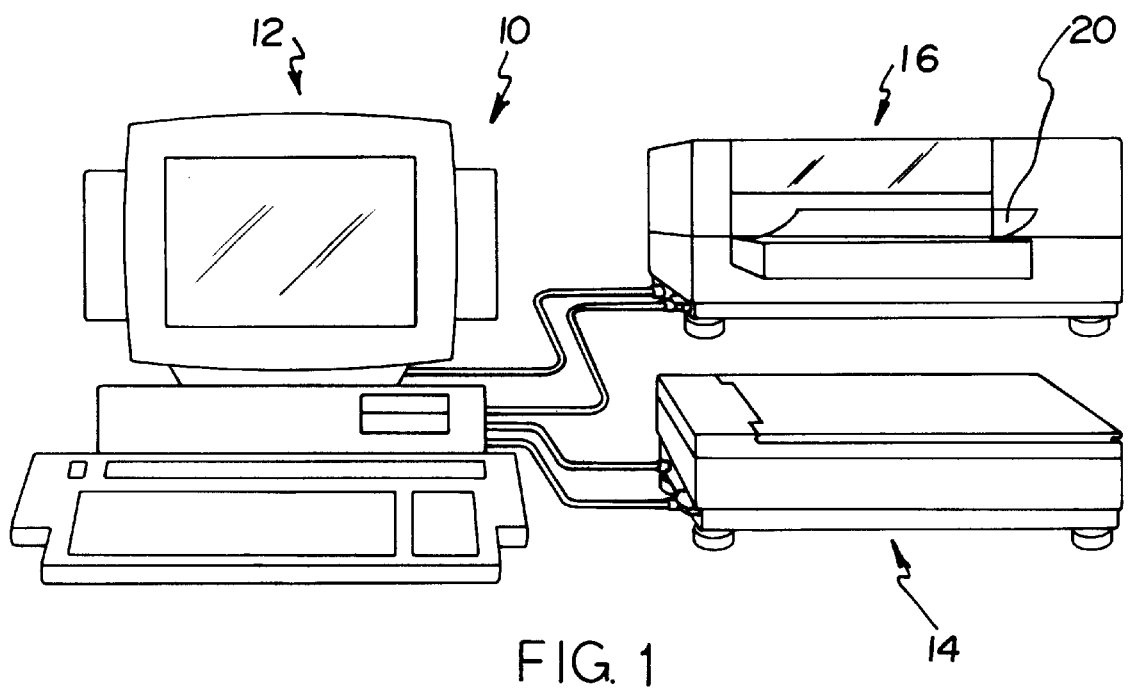
FIG. 1 is a side elevation perspective view of a new Oil Based Computer Printing System according to the present invention.
Figure 2:
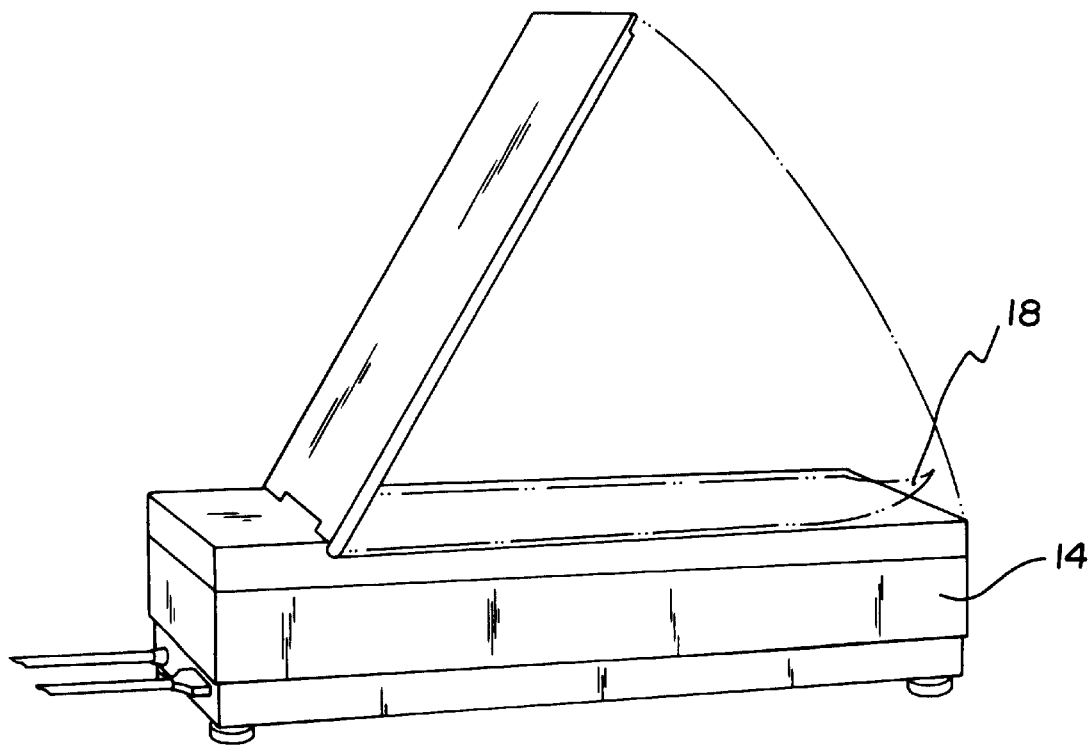
FIG. 2 is a side elevation perspective view of a scanner of the present invention.
Figure 3:
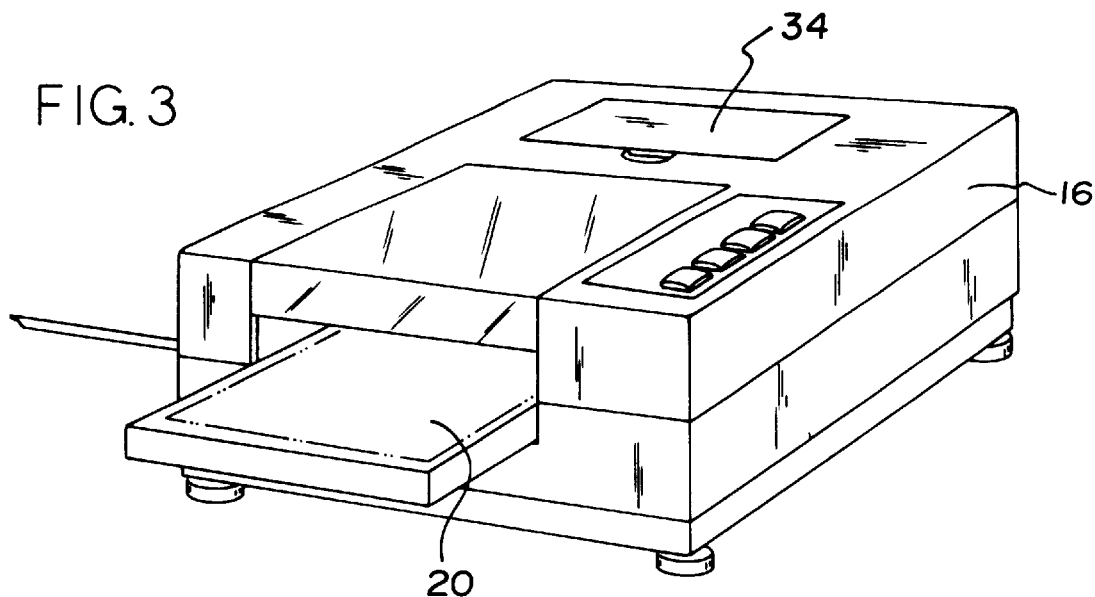
FIG. 3 is a perspective view of a printer of the present invention.
Figure 4:
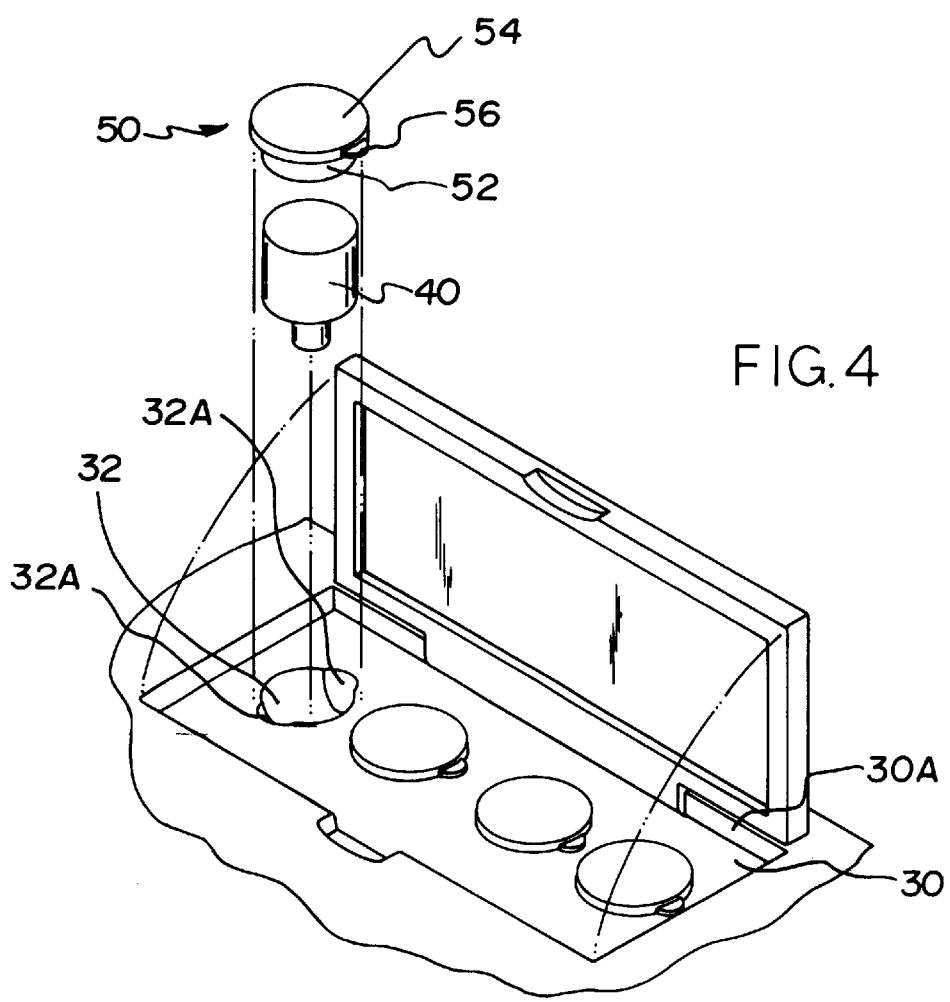
FIG. 4 is an enlarged view of a printer image fluid compartment of the invention.
Figure 5:
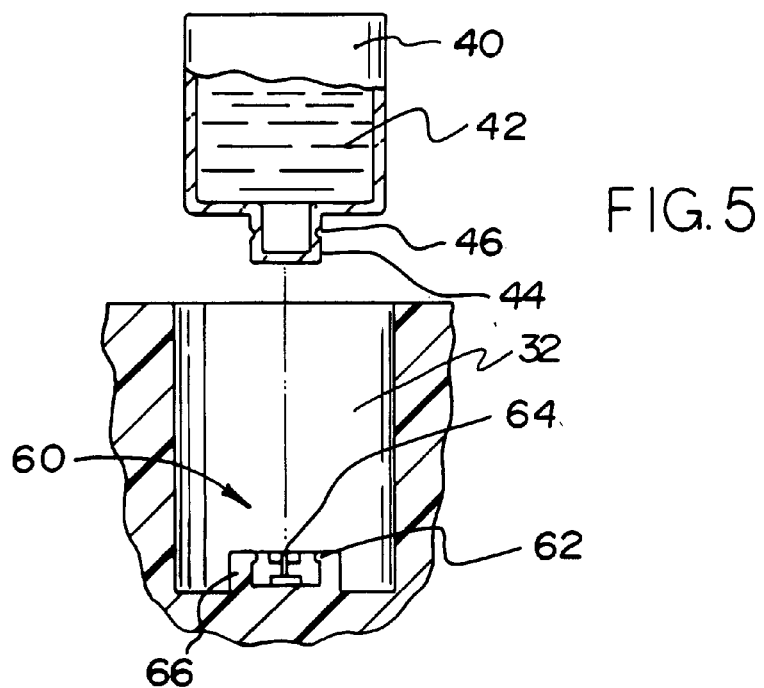
FIG. 5 is a cross sectional view of an image fluid container.
Figure 6:
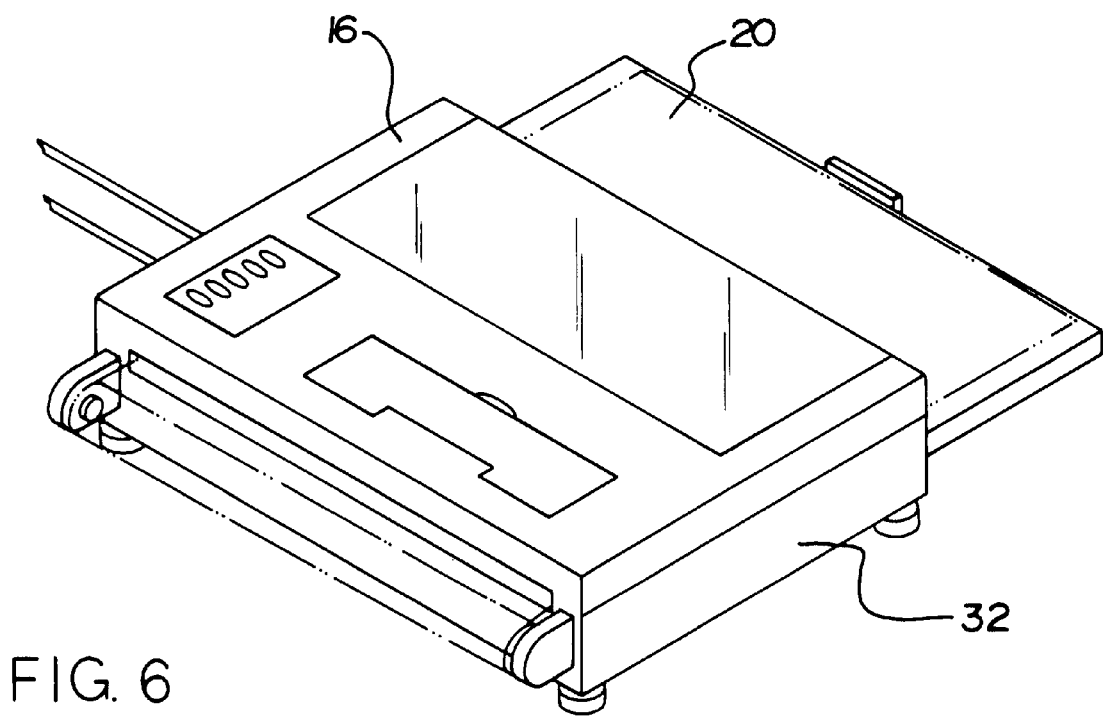
FIG. 6 is a perspective view of another printer of the present invention.

With reference now to the drawings, and in particular to FIGS. 1 through 6 thereof, a new oil based computer printing system embodying the principles and concepts of the present invention and generally designated by the reference numeral 10 will be described.

As best illustrated in FIGS. 1 through 6, the oil based computer printing system 10 comprises a computer 12, a computer scanner 14 electrically connected to the computer 12, and a computer printer 16 electrically connected to the computer 12.

A rough surface material 20, preferably canvas, is loadable into the computer printer 16 and an image document 18 is receivable by the scanner 14 for processing the image on the image document 18 into an associated computer file readable by the printer 16 such that the printer 16 prints the image on the rough surface material 20.

The computer printer 16 further includes an image fluid compartment 30 having four image fluid container receivers 32 in the image fluid compartment 30. Each image fluid container receiver 32 is for holding an associated one of four image fluid containers 40.

A differently colored image fluid 42, preferably an oil based paint, is held in each of the image fluid containers 40. Each image fluid container 40 is held in place by a retaining member 50.

Each image fluid container includes a fluid spout 44 having an annular fluid detent 46 matingly received by a spout assembly 60 of the image fluid compartment receiver 32.

The spout assembly 60 includes a receiving rib 62, a fluid needle 64, and a fluid seal 66. The fluid needle 64 extends upwardly into the image fluid container receiver 32 in a position such that the needle 64 pierces an end of the fluid spout 44 of the image fluid container 40 received by the image fluid container receiver 32 for providing fluid connection between the image fluid container 40 and the computer printer 16. The receiving rib 62 is for mating with the annular fluid detent 46 to hold the image fluid container 40 in sealed fluid connection with the computer printer 16. The fluid seal 66 is for preventing leakage of the image fluid 42 into the image fluid container receiver 32.

The image fluid compartment 30 includes a lid 34 hingedly attached to a medial portion of a lengthwise side 30A of the image fluid compartment 30.

Each image fluid compartment receiver 32 is substantially cylindrical and includes a pair of oppositional hollow portions 32A extending outwardly from an outer perimeter of the image fluid compartment receiver 32 for permitting the grasping of opposite sides of the image fluid container 40 held in the image fluid container receiver 32 by a finger and a thumb of a user for facilitating removal and replacement of the image fluid container 40.

Each retaining member 50 having a substantially circular protrusion 52 snugly insertable into the image fluid container receiver 32 and a cap portion 54 extending radially outward from an upper surface of the protrusion 52 for covering the oppositional hollow portions 32A of the image fluid container receiver 32 when the protrusion 52 is inserted into the image fluid container receiver 32. The cap portion 54 includes a tab 56 extending outwardly from the cap portion 54 for facilitating grasping of the retaining member 50 by a user for removal of the retaining member 50 from the image fluid container receiver 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An oil based computer printing system for processing an image document and printing the image on a rough surface material to produce an oil based print of the image on the material, the computer printing system comprising, in combination:

a computer;

a computer scanner electrically connected to the computer;

a computer printer electrically connected to the computer;

a rough surface material being loadable into the computer printer;

an image document having an image thereon, the image document being receivable by the scanner for processing the image on the image document into an associated computer file;

the computer file being readable by the printer such that the printer prints the image on the rough surface material;

wherein the computer printer further includes an image fluid compartment having four image fluid container receivers in the image fluid compartment, each image fluid container receiver being for holding an associated one of four image fluid containers;

a differently colored image fluid loaded into each said image fluid container;

wherein each image fluid container is held in place by a retaining member;

wherein the image fluid is further defined as an oil based paint;

each image fluid container further having a fluid spout, the fluid spout having an annular fluid detent matingly received by a spout assembly of the image fluid compartment receiver;

the spout assembly having a receiving rib, a fluid needle, and a fluid seal;

the fluid needle extending upwardly into said image fluid container compartment in a position such that the needle pierces an end of the fluid spout of the image fluid container received by the image fluid container receiver for providing fluid connection between the image fluid container and the computer printer;

the receiving rib being for mating with the annular fluid detent to hold the image fluid container in sealed fluid connection with the computer printer;

the fluid seal being for preventing leakage of the image fluid into the image fluid container compartment;

wherein the image fluid compartment includes a lid hingedly attached to a medial portion of a lengthwise side of the image fluid compartment;

each image fluid compartment receiver being substantially cylindrical, each image fluid compartment further including a pair of oppositional hollow portions extending outwardly from an outer perimeter of the image fluid compartment receiver for permitting the grasping of opposite sides of the image fluid container held in the image fluid container receiver by a finger and a thumb of a user for facilitating removal and replacement of the image fluid compartment; and each retainer having a substantially circular protrusion snugly insertable into the image fluid container receiver and a cap portion extending radially outward from an upper surface of the protrusion for covering the oppositional hollow portions of the image fluid container receiver when the protrusion is inserted into the image fluid container receiver, the cap portion having a tab extending outwardly from the cap portion for facilitating grasping of the retainer by a user for removal of the retainer from the image fluid container receiver.

2. The computer printing system of claim 1 wherein the rough surface material is further defined as canvas.

3. An oil based computer printing system for processing an image document and printing the image on a rough surface material to produce an oil based print of the image on the material, the computer printing system comprising, in combination:

a computer;

a computer scanner electrically connected to the computer;

a computer printer electrically connected to the computer;

a rough surface material being loadable into the computer printer;

an image document having an image thereon, the image document being receivable by the scanner for processing the image on the image document into an associated computer file;

the computer file being readable by the printer such that the printer prints the image on the rough surface material;

wherein the computer printer further includes an image fluid compartment having four image fluid container receivers in the image fluid compartment, each image fluid container receiver being for holding an associated one of four image fluid containers;

a differently colored image fluid loaded into each said image fluid container;

wherein each image fluid container is held in place by a retaining member;

wherein the image fluid is further defined as an oil based paint;

each image fluid container further having a fluid spout, the fluid spout having an annular fluid detent matingly received by a spout assembly of the image fluid compartment receiver;

the spout assembly having a receiving rib, a fluid needle, and a fluid seal;

the fluid needle extending upwardly into said image fluid container receiver in a position such that the needle pierces an end of the fluid spout of the image fluid container received by the image fluid container receiver for providing fluid connection between the image fluid container and the computer printer;

the receiving rib being for mating with the annular fluid detent to hold the image fluid container in sealed fluid connection with the computer printer; and the fluid seal being for preventing leakage of the image fluid into the image fluid container receiver;

wherein the rough surface material is further defined as canvas;

wherein the image fluid compartment includes a lid hingedly attached to a medial portion of a lengthwise side of the image fluid compartment;

each image fluid compartment receiver being substantially cylindrical, each image fluid compartment further including a pair of oppositional hollow portions extending outwardly from an outer perimeter of the image fluid compartment receiver for permitting the grasping of opposite sides of the image fluid container held in the image fluid container receiver by a finger and a thumb of a user for facilitating removal and replacement of the image fluid compartment; and each retaining member having a substantially circular protrusion snugly insertable into the image fluid container receiver and a cap portion extending radially outward from an upper surface of the protrusion for covering the oppositional hollow portions of the image fluid container receiver when the protrusion is inserted into the image fluid container receiver, the cap portion having a tab extending outwardly from the cap portion for facilitating grasping of the retaining member by a user for removal of the retaining member from the image fluid container receiver.

* * * * *